US012640035B2

(12) United States Patent　　　　(10) Patent No.: US 12,640,035 B2
Somanath et al.　　　　　　　　　　(45) Date of Patent: May 26, 2026

(54) METHOD AND APPARATUS FOR MESSAGING COORDINATION

(71) Applicant: FORD GLOBAL TECHNOLOGIES, LLC, Dearborn, MI (US)

(72) Inventors: Nithya Somanath, Farmington Hills, MI (US); Shiqi Qiu, Canton, MI (US); Arun Dutta, Ann Arbor, MI (US); Bhagyashri S. Katti, Novi, MI (US); Matthew R. Goulet, LaSalle (CA); Nicholas Alexander Scheufler, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 504 days.

(21) Appl. No.: 17/504,678

(22) Filed: Oct. 19, 2021

(65) Prior Publication Data

US 2022/0044563 A1　　　Feb. 10, 2022

Related U.S. Application Data

(62) Division of application No. 16/775,435, filed on Jan. 29, 2020, now Pat. No. 11,170,644.

(51) Int. Cl.
　*G08G 1/0965*　　　(2006.01)
　*G07C 5/00*　　　　(2006.01)
　*H04W 4/46*　　　　(2018.01)

(52) U.S. Cl.
　CPC ........... *G08G 1/0965* (2013.01); *G07C 5/008* (2013.01); *H04W 4/46* (2018.02)

(58) Field of Classification Search
　CPC ........ G08G 1/0965; G07C 5/008; H04W 4/46
　USPC ......................................................... 340/902
　See application file for complete search history.

(56) References Cited

U.S. PATENT DOCUMENTS

| | | | |
|---|---|---|---|
| 2015/0032328 A1 | 1/2015 | Healey et al. | |
| 2015/0283939 A1 | 10/2015 | Parkes et al. | |
| 2017/0137125 A1* | 5/2017 | Kales | ...................... B64C 27/10 |
| 2018/0026494 A1 | 1/2018 | Lai et al. | |
| 2019/0222885 A1 | 7/2019 | Cho et al. | |
| 2020/0107064 A1* | 4/2020 | Shafai | .............. H04N 21/41415 |

* cited by examiner

*Primary Examiner* — Brian A Zimmerman
*Assistant Examiner* — Cal J Eustaquio
(74) *Attorney, Agent, or Firm* — Joseph Zane; Brooks Kushman P.C.

(57)　　　　　ABSTRACT

A vehicle includes one or more vehicle-exterior displays and a processor. The vehicle receives indication of a second proximate vehicle, the indication including viewing preferences for an occupant of the second proximate vehicle. The vehicle selects content for display on at least one of the vehicle-exterior displays and selects at least one display having an exterior orientation determined to be viewable based on a heading of the second proximate vehicle. The vehicle then displays the selected content on the selected display.

12 Claims, 3 Drawing Sheets

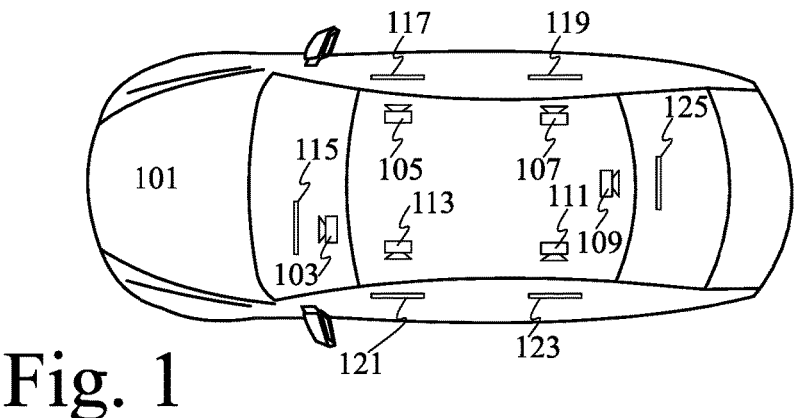
Fig. 1
Fig. 2
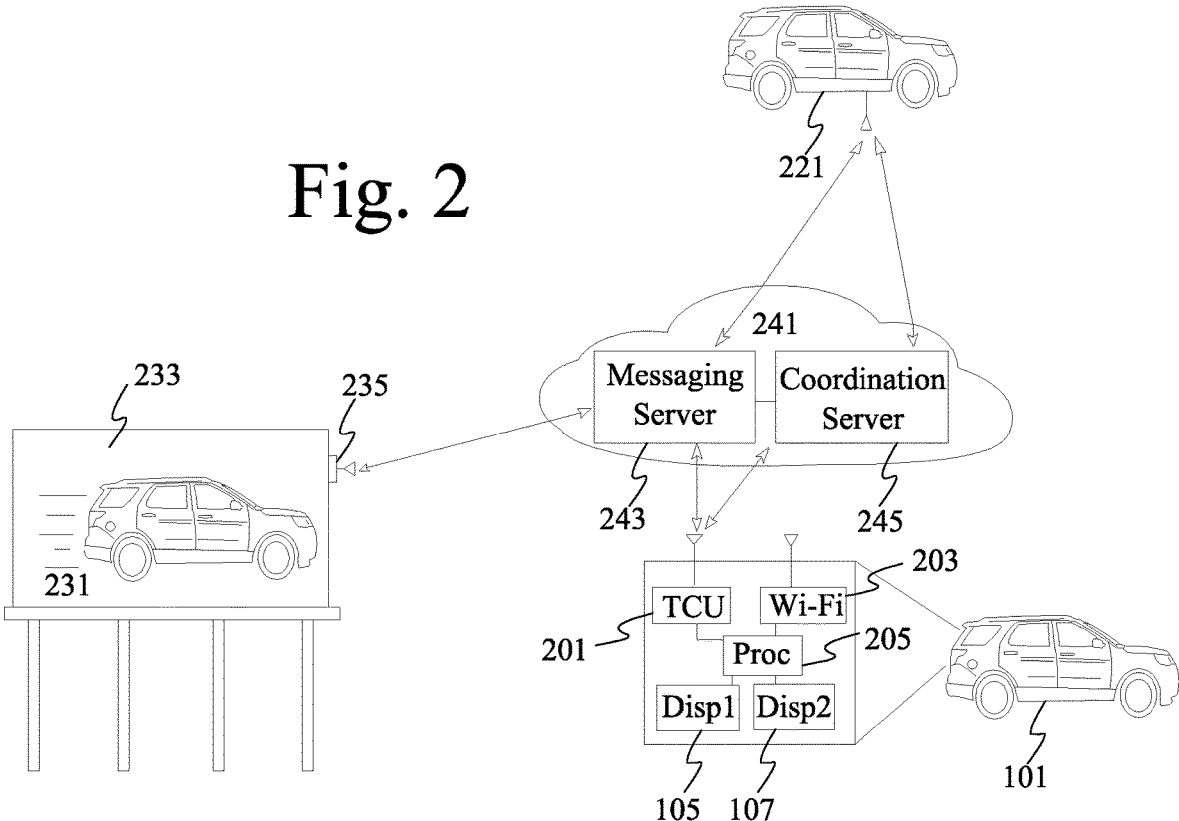

METHOD AND APPARATUS FOR MESSAGING COORDINATION

CROSS-REFERENCE TO RELATED APPLICATIONS

This application is a divisional appplication of U.S. application Ser. No. 16/775,435 filed Jan. 29, 2020, now U.S. Pat. No. 11,170,644, issued Nov. 9, 2021, the disclosure of which is hereby incorporated in its entirety by reference herein.

TECHNICAL FIELD

The illustrative embodiments generally relate to methods and apparatuses for messaging coordination.

BACKGROUND

Organizing and delivering messaging to targeted parties is an ever-increasing challenge in a world inundated with messaging. Even with critical messaging, such as amber alerts and other emergency messages, it can be difficult to deliver the message in effective and targeted formats such that the message is received in a timely and noticeable manner.

At the same time, virtually everywhere one looks there are screens and digital messages. Typically, each screen displays an independent media event or message, which can add to the confusion and the general trend to let all the messaging blend into the background. In a saturated environment such as this, unique messaging has the opportunity to stand out and capture the attention of an intended audience. For example, digital billboards with moving pictures once stood out over static, papered billboards. Messaging must continue to progress to allow important messages to stand out from the crowded media space.

SUMMARY

In a first illustrative embodiment, a vehicle includes one or more vehicle-exterior displays and a processor configured to receive indication of a second proximate vehicle, the indication including viewing preferences for an occupant of the second proximate vehicle. The processor is also configured to select content for display on at least one of the vehicle-exterior displays. The processor is further configured to select at least one display having an exterior orientation determined to be viewable based on a heading of the second proximate vehicle and display the selected content on the selected at least one display.

In a second illustrative embodiment, a system includes a processor configured to receive location information from a plurality of vehicles, indicating a present vehicle location for each vehicle. The processor is also configured to determine that a predetermined vehicle density is exceeded for a predetermined locality based on the location information. The processor is further configured to, responsive to the density being exceeded, select a plurality of entities, each including at least one display viewable from a traveling vehicle that is within the locality and that is not one of the entities. Also, responsive to the density being exceeded, the processor is configured to select content for display on a plurality of entity displays, wherein each entity of the plurality of entities displays a coordinated portion of a message that is cohesively displayed by the entities acting in concert. The processor is additionally configured to send portions of the selected content to each of the entities of the plurality of entities, along with display instructions for timing of content display at each of the entities.

In a third illustrative embodiment, a system includes a processor configured to receive location information from a plurality of vehicles, indicating a present vehicle location for each vehicle. The processor is further configured to determine that an emergency exists for broadcast to a first locality within which one or more of the plurality of vehicles is currently located. The processor is additionally configured to select a plurality of vehicles within the locality, as indicated by the location information, each of the plurality of vehicles having be predesignated as including at least one outward facing display. The processor is also configured to send an emergency message, relating to the emergency, to each selected vehicle, including instructions to display the emergency message on the outward facing display.

BRIEF DESCRIPTION OF THE DRAWINGS

FIG. 1 shows an illustrative example of a vehicle provided with illustrative exterior messaging capability;

FIG. 2 shows an illustrative example of a messaging coordination system;

DETAILED DESCRIPTION

Figure 3:
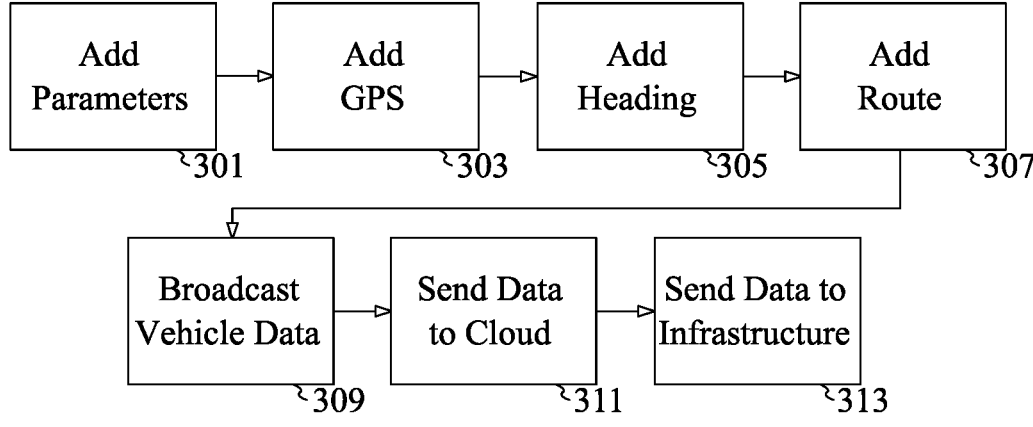
FIG. 3 shows an illustrative example of vehicle reporting.

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Targeted messaging, be it emergency messaging (e.g., amber alerts) or consumer-facing messaging, is desired by many parties. When the message is critical, such as an amber or disaster alert, it is important to reach the maximum number of people as quickly as possible and in as attention-grabbing manner as possible. Obviously, providers of consumer-facing messaging have a similar preference in attention-grabbing and noticeability, without having the same safety-related reasons for the necessity of such.

Messaging is commonly delivered on mobile devices, signage, and occasionally on the sides of vehicles such as busses. For delivering messaging to drivers, it is useful to deliver messaging that allows the driver to still continue to watch the road and environment around the vehicle. Thus, devices like mobile devices and in-vehicle screens are often insufficient to delivery messaging that is noticeable and within a driver's planned field-of-view.

To account for this, people have used billboards, busses, moving sign vehicles and digital signage to deliver messaging to drivers. While these are highly-effective at delivering a broad message, these sources are almost always pre-planned in terms of content, and therefore lack adaptability as well as lacking the ability to deliver at targeted message to an individual user. Certain digital signage is usable to deliver road emergencies and other messaging, but these are typically municipally-installed highway signs and thus tend to be fairly infrequently placed, and capable of reaching large audiences only over a protracted period of time.

The illustrative embodiments propose a new version of digital signage, which includes messaging projected on a vehicle exterior surface, with digital adaptability and the capability to target individual users. This keeps the messaging within the driver's intended field-of-view but creates literally thousands of additional sources of messaging for delivering thousands of individual messages across a wide area or, through coordination, delivering a cohesive message to a large group of individuals at the same time.

While the concepts are discussed in terms of images projected on screens that are viewable from an exterior of the vehicle, it is appreciated that any coordinated or instructed output can also be provided on a variety of other display media, as well as provided in conjunction with, or in the form of, audio output, haptic feedback, etc. Displays can include, but are not limited to, liquid crystal displays, light emitting diode matrices, organic light emitting diodes, electronic paper, and any other suitable display medium that allows for a visible display to be provided and altered in conjunction with the instructions for content display. In a similar manner, audio output can include, but is not limited to, vehicle internal speakers, vehicle exterior speakers, infrastructure speakers, etc. Suitable coordination of various output systems can be configured, instructed and coordinated for a desired implementation.

In some embodiments, internal vehicle components of a vehicle whose occupants are viewing a display according to a display embodiment may also be provided with vehicle-internal audio or even haptic feedback. This audio can be coordinated by vehicle-to-vehicle, vehicle-to-cloud or vehicle-to-infrastructure communication, for example. In a similar manner, haptic feedback can be coordinated to act in conjunction with a viewed or viewable content. Haptic feedback can include, but is not limited to, vibrating seats or steering wheel, pulsing a vehicle with braking, etc.

Further, a vehicle can react to viewed or viewable content by using a vehicle camera or other signaling (e.g., wireless or light signaling) to detect displayed content in a field-of-view of a vehicle occupant, and then use information included in that content (QR code or other information) or known information about that content (e.g., via a lookup) to obtain or derive audio and haptic feedback that coordinates with the content, such that the in-vehicle experience for a viewer reflects externally displayed content in a more immersive manner. In still another embodiment, one or more vehicles in defined proximity of certain content and/or having a heading such that the content is likely viewable may be provided with instructions for internal output coordination as the vehicle travels over a certain coordinate set or for a duration of when the content is projected to be viewable. Any one form of output can thus be coordinated with any other form of output as suitable for a given implementation, and the output in one or both instances can be vehicle-internal, vehicle-external or both, as is suitable for the output based on the intended audience for the particular output.

FIG. 1 shows an illustrative example of a vehicle provided with illustrative exterior messaging capability. This illustrative vehicle 101 includes a plurality of exterior screens, although any given vehicle 101 may simply have one or more of these screens, and does not need all such screens to function with certain of the illustrative embodiments.

In this example, the vehicle 101 includes six projectors 103, 105, 107, 109, 111, 113. There is a heads up display (HUD) projector 103, which is capable of projecting a message internally on a vehicle 101 front windshield 115 display screen that is viewable by a driver and is typically fairly transparent so as not to block the view of the road. Screens 117, 119, 121, 123 are viewable by others viewing a given side window of the vehicle 101, and each is individually powered by a projector 105, 107, 111, 113. Alternatively, a central projector could have lensing that could be aimed at any given window screen at an appropriate time. These screens can have the image projected on the backs thereof, and display the image on the front thereof, through the use of appropriate coatings on the respective windows.

Screen 125 can be viewed by a trailing driver and is powered by projector 109. Each or any of these screens can display the same or a different targeted message. When working in conjunction, a plurality of screens and/or vehicles can display a coordinated message, which can essentially be a scrolling message in some instances, or, in the case of an emergency message, hundreds or thousands of screens could display the same message, rendering the message immediately viewable by thousands of drivers and other vehicle occupants, as well as pedestrians.

FIG. 2 shows an illustrative example of a messaging coordination system. In this example, vehicle 101 includes a central processor 205, a plurality of displays 105, 107, and one or more remote communication devices, such as a telematics control unit (TCU) 201 and a Wi-Fi transceiver 203. Other vehicles 221 include similar technology and can serve as consumers and/or providers of messaging.

A cloud 241 system can include a messaging server 243 and a coordination server 245. These may be distinct entities or the same entity. The coordination server 245 may receive information on the locations and density of vehicles 101, 221. When vehicles 101, 221 are disparately spaced, individual vehicles 101 may deliver messaging for another local vehicle 221, as determined onboard vehicle 101 or by the messaging server 101. When the vehicles are closely packed within a certain density, it may be difficult to present individual messaging, and the vehicles 101, 221 may act in a coordinated manner as directed by the messaging server 243 in order to present a cohesive message, where different parts of the message may appear on different vehicles 101, 221.

Vehicles 101, 221 can even act in concert with permanent signage, such as billboard 231. In this example, billboard 231 displays a digital adaptable message 233. The billboard also includes a transceiver 235 so that the billboard can both receive messaging from the messaging server 243 and so the billboard can inform the messaging server 243 which content the billboard is currently displaying. The billboard can further act in concert with nearby vehicles via infrastructure to vehicle (I2V) communication. This can absolve the server of the responsibility of tracking each vehicle, and instead can result in the billboard communicating with nearby vehicles to further a message.

For example, the billboard can display a first message and can send a signal to nearby vehicles to display a secondary message related to the first message. When a given vehicle moves out of range, the billboard can instruct a new vehicle to display the message. Or, alternatively, the billboard can instruct any number of nearby vehicles to display the message and not keep track of which vehicles have moved out of range. A server may be better suited to determine the aggregate density of vehicles in a larger area, but the billboard can also track density to conclude when individual vehicle coordinated messaging (based on high density of available communication) is appropriate.

When desired, individual vehicles 101 can reflect messaging of the billboard 231 and vice versa. For example, if a sporting event is experiencing traffic backups at certain exits, a billboard may be tasked with displaying a preferred exit for people that can view the billboard. Vehicles traveling on the same roads (that can see the billboard, e.g., a highway) can display the recommended exits as well, especially close to the event, since many of the vehicles on the highway will likely be traveling to the event. In such a manner, a group of vehicles can be dynamically adapted to serve as widespread mobile traffic messaging. If there were, for example, three desirable exits, vehicles preceding each exit (but after a previous exit) could be individually adapted to direct traffic to the relevant next-exit. In a similar manner, in the case of an emergency in a city, thousands of vehicles could be individually adapted to direct local people viewing those vehicles to behave in a manner appropriate for a given locality. Similarly, the billboard, as opposed to the server, can coordinate some or all aspects of this messaging as noted above, through I2V communication.

For example, in the case of a tornado alert, vehicles near $3^{rd}$ St. and Main St. may display—Tornado Alert go to the shelter on $3^{rd}$ and Main; and vehicles near $15^{th}$ Ave. and Rodgers St. may display—Tornado Alert, go to the shelter on $15^{th}$ and Rodgers, and other vehicles not near a shelter may display—Tornado Alert, seek immediate shelter in a nearby building. Each message is pertinent to the local viewers, is locally-useful and the overall alert is widely and immediately delivered, along with relevant instructions. Consumer facing messaging can be coordinated in a similar manner, when it is desired to deliver a vast reaching consumer facing message.

FIG. 3 shows an illustrative example of vehicle reporting. Vehicles 101 can report their location and messaging preferences to infrastructure (V2I), to other vehicles (V2V) and to the cloud (V2C). This location can be used to determine vehicle density and to toggle messaging systems between individual messages and group-targeting messaging. Vehicle identified messaging preferences can be used to provide targeted individual messaging, and group preferences can be used to provide group messaging when density is high. Vehicles could also indicate intended destinations, for example, such as in the sporting event example, so the coordination server 245 could more easily determine if it was appropriate to use a group of vehicles on the highway to provide driving instructions to other nearby vehicles on the same highway.

In this example, a driver or occupant has identified one or more preferences for messaging which can be stored on the vehicle 101. This can be based on a driver profile, an occupant profile, or observed preferences for onboard messaging. The vehicle 101 adds these preferences for messaging to a transmittable packet at 301. The vehicle 101 also adds GPS coordinates at 303 and a current heading at 305.

Entities receiving the vehicle coordinates and heading can determine if a given messaging source (e.g., another vehicle 221 or signage 231) will be likely viewable by the object vehicle 101. The vehicle 101 also adds its route information, or at least proximate route information at 305, which can be used for planning purposes in terms of both density calculations and messaging delivery.

Then, in this example, the vehicle 101 provides the information in several manners, any one of which could be included or excluded in a solution. Here, the vehicle 101 broadcasts the data locally using, for example, Wi-Fi at 309. This local broadcast is not targeted at any given vehicle, but can be received by other nearby vehicles and infrastructure units to determine if those vehicles or signage should change displays. When density is below a certain threshold, individual vehicles 221 and signage 231 may self-elect to change based on the presence of an individual vehicle 101 expressing a certain messaging preference.

The vehicle 101 also sends the data to the cloud at 311, for use by the coordinate server 245 in planning purposes. The vehicle 101 may further send the data to specific infrastructure units at 313, if those units were not using the data based on the broadcast at 309 (e.g., if the units required direct communication as opposed to including the capability for receiving broadcast data).

Figure 4:
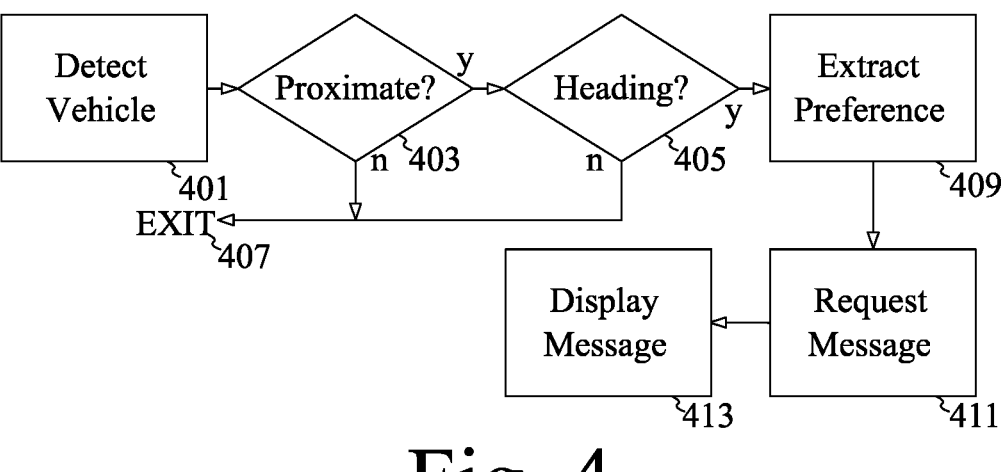
FIG. 4 shows an illustrative example of messaging planning and presentation.

FIG. 4 shows an illustrative example of messaging planning and presentation, executable by, for example, a vehicle 101 displaying a message for a vehicle 221. In this example, the vehicle 101 detects that another vehicle is nearby at 401. This detection can be based on direct communication between the vehicles 101, 221, or can be based on detecting a broadcast signal. In this example, the vehicle 101 is capable of determining where the other vehicle 221 is located based on the received signal at 403, and if the other vehicle 221 is not proximate at 403 or headed correctly to see signage on 101 at 405, the vehicle 101 ignores the data and the process exits at 407.

If the other vehicle 221 is nearby at 403 and/or headed correctly at 405, the vehicle 101 extracts vehicle 221 preference data at 409. This is the data that reflects the messaging preference of the vehicle 221 occupants, and since, in this example, high vehicle density is not causing coordinated messaging, vehicle 101 will display messaging in accordance with a preference of the occupants of vehicle 221.

Vehicle 101 may also include an onboard messaging database or, as in this example, may request messaging from a remote messaging server 243 at 411. The remote server 243 may determine the appropriate messaging to be displayed, and instruct the vehicle 101 to display one or more messages delivered back to 413. Vehicle 101 displays any appropriate onboard or received messaging at 413 on one or more vehicle-exterior displays that are viewable by the vehicle 221. This can include coordinated messaging on a plurality of vehicle displays or a single message on one or more displays.

Figure 5:
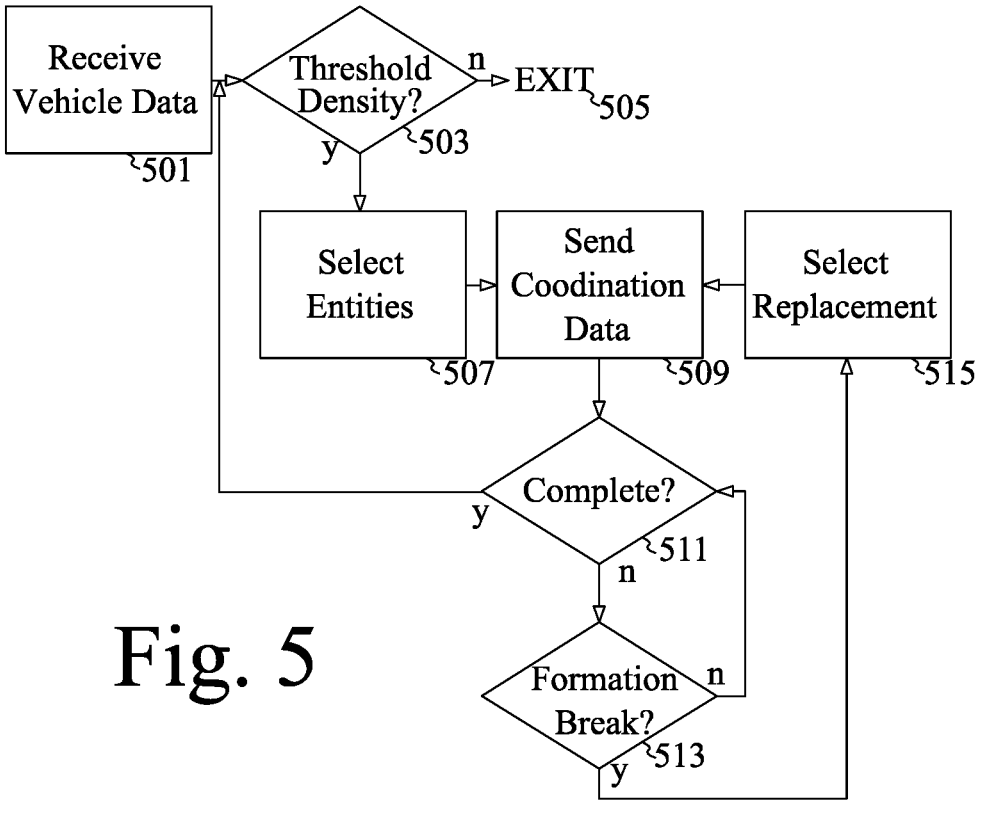
FIG. 5 shows an illustrative example of messaging planning and distribution.

FIG. 5 shows an illustrative example of messaging planning and distribution, executable by, for example, a coordination server 245 and/or the messaging server 243. In this example, when vehicle density within a predefined region reaches a certain threshold (the predefined region can simply be an area of predefined X size with Y density, and not locked to any given coordinate set). Accordingly, the server 245 receives reported vehicle data at 501 from a plurality of vehicles.

Once the received data indicates that vehicles in any given area are above a threshold density at 503, the server 245 can plan and coordinate messaging for that area. In this example, the server 245 exits the planning process at 505 when the newly received data does not indicate certain densities, but the server could also use the individual data to plan messaging for individual vehicles in a manner similar to the coordinated messaging described below, but for a single target 221 and/or delivery vehicle 101.

When vehicle density reaches a certain threshold, or, for example, if emergency messaging is desired in another example, the server 245 can select one or more connected vehicles 101 for message delivery. If the message is singular, but widespread (e.g., a general purpose emergency message), the server 245 may select all vehicles to which the message applies. In another example, where the emergency message may include coordinated data for certain localities, the server 245 can select groups of vehicles to which a coordinated effort may apply.

For example, using the tornado alert, the server 245 may select all vehicles to deliver an initial alert message about the tornado (all vehicles within the zone that applies to the tornado). Then, for groups of vehicles proximate to a given shelter, the server may select those groups individually and send displayable directions or instructions to a shelter to those vehicles.

Another option is to send a larger packet of data, which can include instructions for modified display when a vehicle is located within a given coordinate set. That is, the data can include a more generalized message, as well as messages to be displayed on vehicles located proximate to shelters. Which methodology is used is a matter of choice by the solution provider.

In still further examples, the server 245 is delivering coordinated consumer-facing messaging, such as a scrolling message across several vehicles and/or coordinating vehicle messaging with signage. In this example, the server 245 selects the vehicles of interest and/or signage of interest at 507, and sends coordination data as to what message each individual displaying-entity is to display, and when at 509.

Vehicles can be selected for cohesive messaging, when acting in concert, based on indicated routes included in vehicle location reporting. Further, if possible, the vehicles can be selected based on being in indicated immediate proximity to each other, without any intervening vehicles. This immediate proximity can be used for forming a cohesive message (e.g., a single letter of a word on each vehicle), although many cohesive messages will be brief in nature due to the fact that vehicles may constantly change position. In at least some instances, however, such as a single lane road with no turn offs, vehicles in ordered position will remain in this manner necessarily, at least for a time, and this fact can be used to display a longer-lasting cohesive message.

Since the coordinated messaging may require some time to complete, the server 245 tracks whether the messaging was completed successfully at 511. If the messaging is not completed at 511, and if a vehicle has broken formation at 513 (turned off of a road, powered down, parked, etc) in a manner that will disrupt the overall message, the server 245 selects a replacement vehicle at 515 which can fill in for the now-missing vehicle in delivering the message. The server 245 can then deliver the content for the replacement vehicle, along with any timing and delivery instructions, and this can continue until the message is complete.

For example, if a unified message with text on vehicle 1, an image on vehicle 2 and more text on vehicle 3 was to be delivered, and then vehicle 2 parked, a new vehicle, vehicle 4, could be selected by the server. The server could deliver the image to vehicle 4, which would fill in the image. If vehicle 4 was not correctly located for the unification of the message, the server 245 could then instead deliver the text of vehicle 1 to vehicle 4, for example, and deliver the image to vehicle 1, if that ordering achieved the cohesive message. Then vehicle 1 would shift to the image display and vehicle 4 would display the text previously displayed by vehicle 1.

Figure 6:
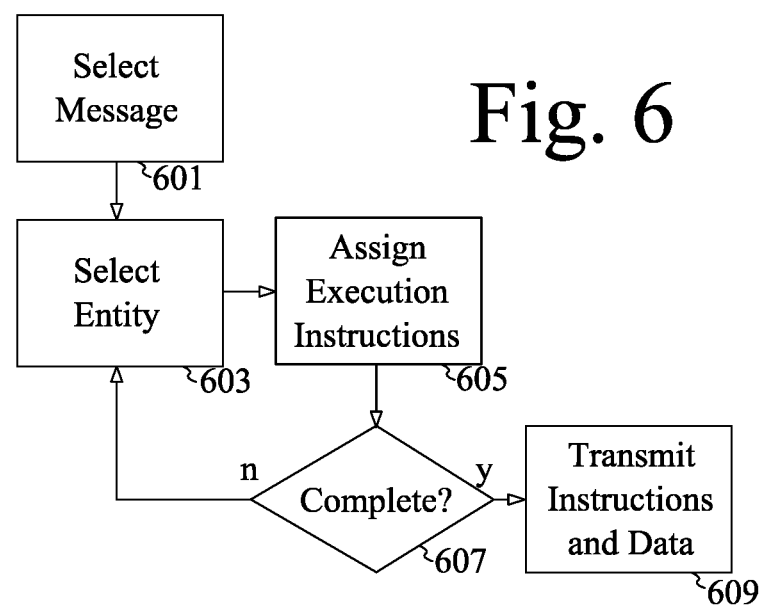
FIG. 6 shows an illustrative example of messaging coordination.

FIG. 6 shows an illustrative example of messaging coordination, executable by, for example, the messaging server 243. In this example, the server 243 selects a message for delivery at 601, whereby the message has multiple parts or coordinated delivery. The server determines how many entities are needed for the message, and what particular entities should be used for elements of the message. For example, signage may display a persistent message while individual vehicles may display scrolling or changing message elements. The signage could display, for example, a product and the vehicles could spell out a company name or tagline. Or the signage could display an overall emergency message, and the individual vehicles could display localized alerts about where viewers should go.

After determining which entities are needed, the server 243 selects an individual connected entity at 603, and assigns one or more elements of the message to the entity at 605, along with parameters for execution of the message. If the selection process is complete at 607, the server 243 can deliver the data elements and instructions to each entity at 609. If the selection process is not complete at 607, the server 243 can continue to select entities and assign message elements to those entities.

Once each entity has received display elements and display content, those entities can work according to included instructions to present the cohesive message. This can be, as previously described, coordinate emergency messaging, coordinated consumer facing messaging, etc. A given vehicle with multiple displays facing multiple directions can even participate in multiple messages, since any given side of the vehicle (and the corresponding displays) may only be visible to certain entities. Thus, a single vehicle 101 can be used to coordinate 3 or more messages in different directions as well as present a HUD message to a driver.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:

a processor configured to:

receive location information from a first plurality of vehicles, indicating a present vehicle location for each vehicle and wherein the location information includes routing information indicating a planned route of at least a second plurality of the first plurality of vehicles;

determine that a predetermined vehicle density is exceeded for a predetermined locality based on the location information;

responsive to the density being exceeded, select a third plurality of the second plurality, each including at least one display viewable from a traveling vehicle that is within the locality and that is not one of the entities, the selection based at least in part on the location information for vehicles of the third plurality indicating present adjacency of at least one vehicle of the third plurality to another vehicle of the third plurality and based at least in part on the routing information received from each vehicle of the third plurality indicating a common route, for at least a predetermined distance, for the vehicles of the third plurality;

responsive to the density being exceeded, select content for display on a plurality of vehicle displays of vehicles of the third plurality, wherein each vehicle of the third plurality of vehicles displays a coordinated portion of a message that is cohesively displayed by the third plurality of vehicles acting in concert; and send portions of the selected content to each of the vehicles of the third plurality of vehicles, along with display instructions for timing of content display at each of the vehicles of the third plurality of vehicles.

2. The system of claim 1, wherein the instructions include identification of at least one display to use for displaying the content, for each selected vehicle that has more than one display.

3. The system of claim 1, wherein the processor is configured to:

determine that at least one of the third plurality of vehicles has deviated from a previously identified route for the at least one vehicle, based on received updated location information from the at least one vehicle;

responsive to the determination of deviance from the previously identified route, select a new vehicle, based on received location information from the new vehicle including routing information for the new vehicle, the routing information from the new vehicle indicating that the new vehicle will be expected to remain in proximity to remaining, non-deviating vehicles of the third plurality; and send any content remaining for display by the deviating at least one vehicle to the new vehicle, along with display instructions for the content remaining for display.

4. A method comprising:

receiving location information from a first plurality of vehicles, indicating a present vehicle location for each vehicle, wherein the location information received from a second plurality of vehicles of the first plurality of vehicles includes route information indicating a planned route;

determining that a predetermined vehicle density is exceeded for a predetermined locality based on the location information;

responsive to the density being exceeded, selecting a plurality of entities, each including at least one display viewable from a traveling vehicle that is within the locality and that is not one of the entities, wherein the selection of the entities includes selecting a plurality of vehicle entities of the second plurality of vehicles that are expected to remain in proximity to each other for a predefined time period based on the route information received from the selected vehicles;

responsive to the density being exceeded, selecting content for display on a plurality of entity displays of the selected entities, wherein each entity of the plurality of entities displays a coordinated portion of a message that is cohesively displayed by the selected entities acting in concert; and sending portions of the selected content to each of the entities of the plurality of selected entities, along with display instructions for timing of content display at each of the entities.

5. The method of claim 4, wherein at least one of the entities is a digital sign.

6. The method of claim 4, wherein the instructions include identification of at least one display to use for displaying the content, for each selected entity that has more than one display.

7. The method of claim 4, further comprising:

determining that at least one of the plurality of vehicle entities has deviated from a previously identified route, based on received updated location information from the at least one vehicle entity;

responsive to the determination of deviance from the previously identified route, selecting a new entity, based on received location information from the new entity, the location information from the new entity indicating that the new entity will be expected to remain in proximity to remaining, non-deviating vehicle entities; and sending any content remaining for display by the deviating entity to the new entity, along with display instructions for the content remaining for display.

8. The method of claim 4, wherein the vehicle entities are further selected based on being immediately proximate to each other, as indicated by the location information received from the selected vehicles, without intervening vehicles, such that the content forms a cohesive message when displayed, provided that the vehicle entities remain in immediate proximity.

9. The method of claim 4, wherein the vehicle entities are selected based on being in an ordered spatial relationship to each other, as indicated by the location information received from the selected vehicles, such that the content forms an ordered message when displayed, provided that the vehicle entities remain in the ordered spatial relationship.

10. A non-transitory computer-readable storage medium storing instructions that, when executed, cause one or more processors to perform a method comprising:

receiving location information from a plurality of vehicles, indicating a present vehicle location for each vehicle;

determining that a predetermined vehicle density is exceeded for a predetermined locality based on the location information;

responsive to the density being exceeded, selecting a plurality of entities, each including at least one display viewable from a traveling vehicle that is within the locality and that is not one of the entities, the selection including at least a second plurality of vehicle entities of the first plurality of vehicles and based at least in part on the location data received from the second plurality of vehicle entities indicating the second plurality of vehicles being in an ordered spatial relationship to each other such that the content forms an ordered message when displayed, provided that the second vehicle entities remain in the ordered spatial relationship;

responsive to the density being exceeded, selecting content for display on a plurality of entity displays of the selected plurality of entities, wherein each entity of the selected plurality of entities displays a coordinated portion of a message that is cohesively displayed by the selected entities acting in concert; and sending portions of the selected content to each of the entities of the selected plurality of entities, along with display instructions for timing of content display at each of the selected entities.

11. The storage medium of claim 10, wherein the location information includes route information, and wherein the selection of the vehicle entities is based at least in part on the route information indicating that the selected vehicle entities are expected to remain in proximity to each other for a predefined time period.

12. The storage medium of claim 11, the method further comprising:

determining that a first one of the second plurality of vehicle entities has deviated from a previously identified route, based on received updated location information from the first one vehicle entity;

responsive to the determination of deviance from the previously identified route, selecting a new vehicle entity, based on received location information from the new vehicle entity including routing information, the routing information from the new vehicle entity indicating that the new vehicle entity will be expected to remain in proximity to remaining, non-deviating vehicle entities; and sending any content remaining for display by the deviating entity to the new vehicle entity, along with display instructions for the content remaining for display.

* * * * *